United States Patent
Takeda et al.

(10) Patent No.: US 6,960,078 B2
(45) Date of Patent: Nov. 1, 2005

(54) LIQUID HEATING COOKER

(75) Inventors: Eiichi Takeda, Nagoya (JP); Akito Takahashi, Nagoya (JP); Gou Nagao, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 0 days.

(21) Appl. No.: 10/321,197

(22) Filed: Dec. 17, 2002

(65) Prior Publication Data

US 2003/0111072 A1 Jun. 19, 2003

(30) Foreign Application Priority Data

Dec. 17, 2001 (JP) ........................................ 2001-382511

(51) Int. Cl.$^7$ ............................. A47J 27/14; A47J 37/12
(52) U.S. Cl. ....................... 431/390.1; 99/408; 392/441
(58) Field of Search .......................... 126/373.1–390.1; 99/403–418; 220/565–567.3; 392/441–448

(56) References Cited

U.S. PATENT DOCUMENTS

| | | | | |
|---|---|---|---|---|
| 2,912,975 A | * | 11/1959 | Del Francia | ............. 126/391.1 |
| 3,998,350 A | * | 12/1976 | Massac | ....................... 220/565 |
| 4,023,726 A | * | 5/1977 | Massac | ....................... 228/184 |
| 4,574,183 A | * | 3/1986 | Knauss | ....................... 219/438 |
| 4,751,915 A | * | 6/1988 | Price | ....................... 126/391.1 |
| 4,848,318 A | * | 7/1989 | Brewer | ................... 126/376.1 |
| 4,913,041 A | * | 4/1990 | Taber et al. | ................... 99/403 |
| 5,809,995 A | | 9/1998 | Kobayashi et al. | |
| 5,836,238 A | | 11/1998 | Kobayashi | |
| 6,196,119 B1 | * | 3/2001 | Takahashi | ..................... 99/403 |
| 6,736,130 B2 | * | 5/2004 | Takahashi | ................ 126/391.1 |
| 6,758,209 B2 | * | 7/2004 | Takeda et al. | ........... 126/391.1 |
| 2002/0096170 A1 | * | 7/2002 | Takahashi | ................ 126/391.1 |
| 2003/0150335 A1 | * | 8/2003 | Mote et al. | ................... 99/330 |

FOREIGN PATENT DOCUMENTS

| | | | | | |
|---|---|---|---|---|---|
| EP | 1319358 A1 | * | 6/2003 | ............ | A47J/37/12 |
| JP | 08238182 A | * | 9/1996 | ............ | A47J/37/12 |
| JP | 11009472 A | * | 1/1999 | ............ | A47J/37/12 |
| JP | 2001061674 A | * | 3/2001 | ............ | A47J/37/12 |
| JP | 2003180533 A | * | 7/2003 | ............ | A47J/37/12 |

* cited by examiner

*Primary Examiner*—Monica S. Carter
*Assistant Examiner*—James G. Barrow
(74) *Attorney, Agent, or Firm*—Burr & Brown (57) ABSTRACT

A liquid heating cooker including a box-shaped vat having a bottom panel A, rear panel B, left panel C, right panel D, and holding panel E, which are separated by welding lines F to I. The welding lines F and G are provided on a front wall portion, a bottom wall portion, a front wall portion and upper bottom wall portions 12e and 12f of an oil sediment holding portion, and a rear wall portion, whereas the welding lines H and I are provided on the front wall portion and the rear wall portion of the oil sediment holding portion. The welding lines are not provided at the corner portions of the vat and the corner portions are rounded. Consequently, even if the fryer is repeatedly operated and stopped, cracking at the welded portions and/or the corner portions due to expansion and contraction of the panels does not occur easily.

6 Claims, 7 Drawing Sheets

PRIOR ART

FIG. 6

PRIOR ART

PRIOR ART

FIG. 9

LIQUID HEATING COOKER

This application claims the benefit of Japanese Application 2001-382511, filed Dec. 17, 2001, the entirety of which is incorporated herein by reference.

BACKGROUND OF THE INVENTION

1. Field of the Invention

The present invention relates to liquid heating cookers such as fryers and noodle boilers in which a heating medium such as cooking oil or water that has been filled into a vat is heated by a burner so as to cook foods such as French fries or noodles.

2. Description of the Related Art

Figure 9:
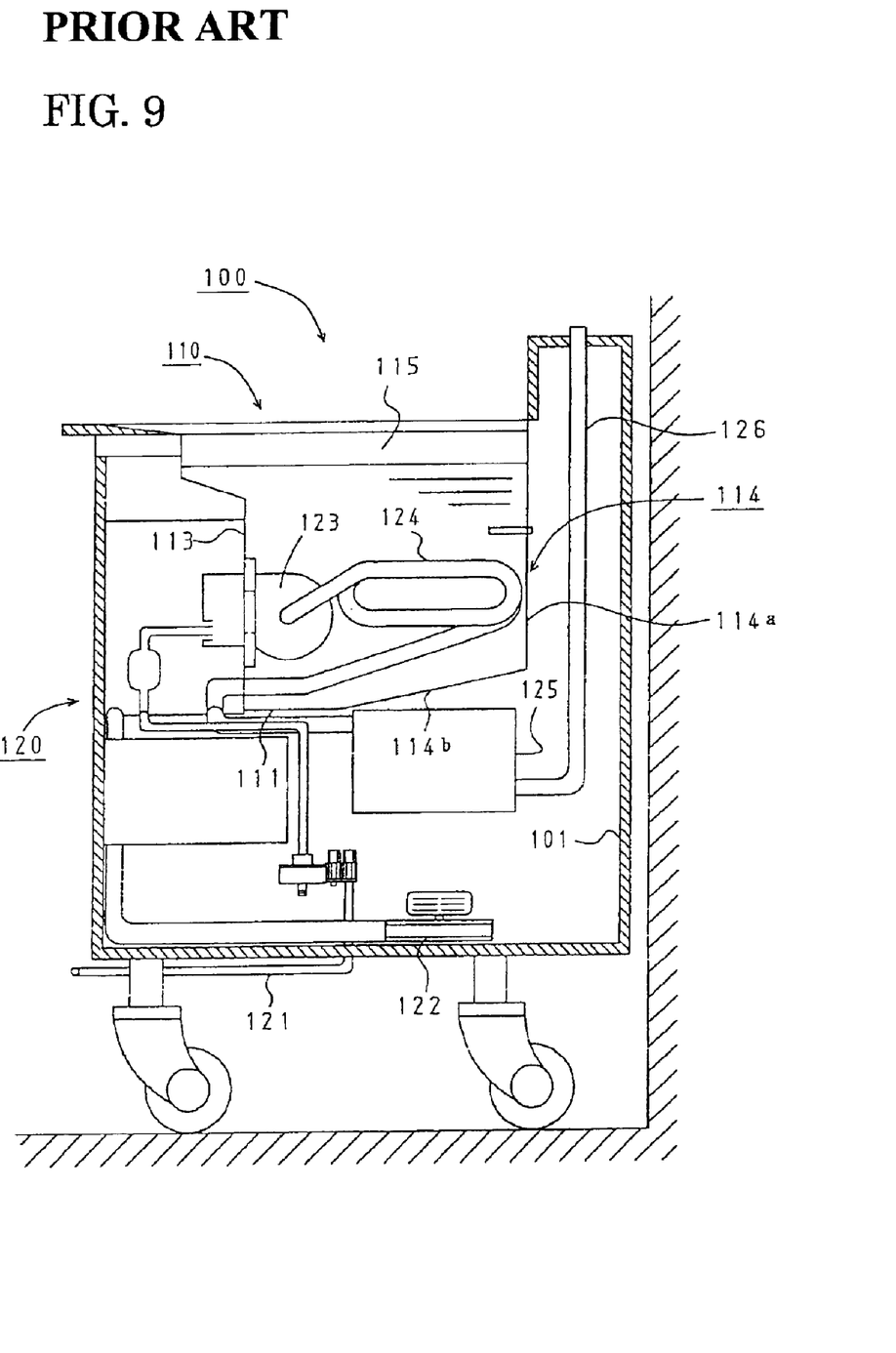
FIG. 9 is a cross-sectional view of a conventional fryer seen from the side.

Conventionally, fryers such as a fryer 100 shown in FIG. 9 are known. The fryer is provided with a vat 110 into which cooking oil for deep frying foods, such as French fries and chicken is filled, and a pulse burner 120 for heating the oil within the vat 110. The vat 110 and the pulse burner 120 are contained within a main housing 101. In the pulse burner 120, a combustion exhaust system is made of a combustion chamber 123 provided within the vat 110 and in which pulse combustion is carried out, a tailpipe 124 that serves as a route for discharging high temperature combustion exhaust from the combustion chamber 123, a decoupler 125 provided on the downstream side of the tailpipe 124, and an exhaust duct 126 provided on the downstream side of the decoupler 125.

Also, a gas conduit 121 for supplying fuel gas to the combustion chamber 123 is provided below the main housing 101, and a blower 122 for delivering air for combustion to the combustion chamber 123 is provided on the bottom surface of the main housing 101.

Figure 7:
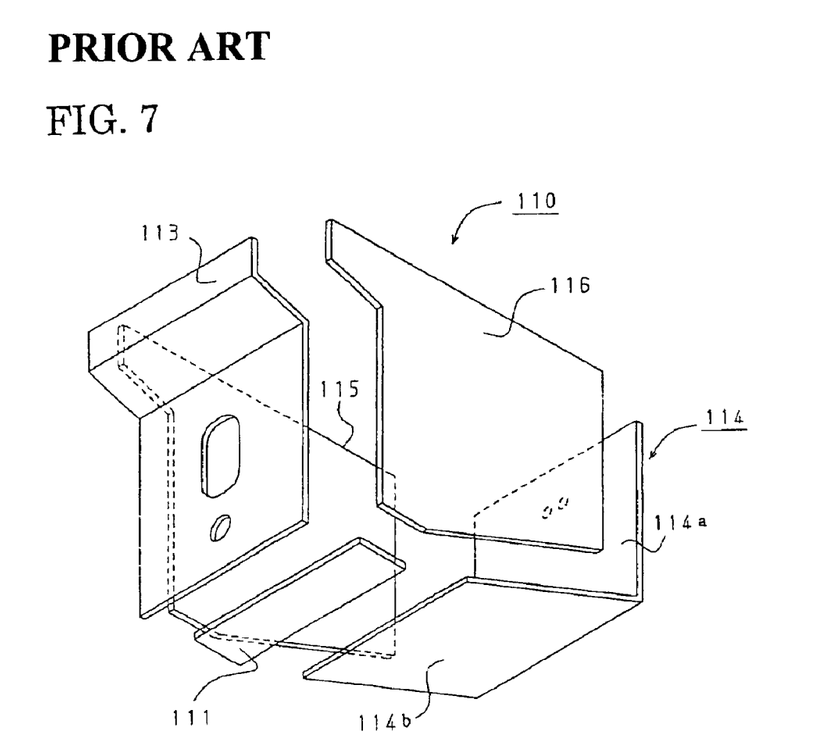
FIG. 7 is a perspective view of the components making up a conventional vat.
Figure 8:
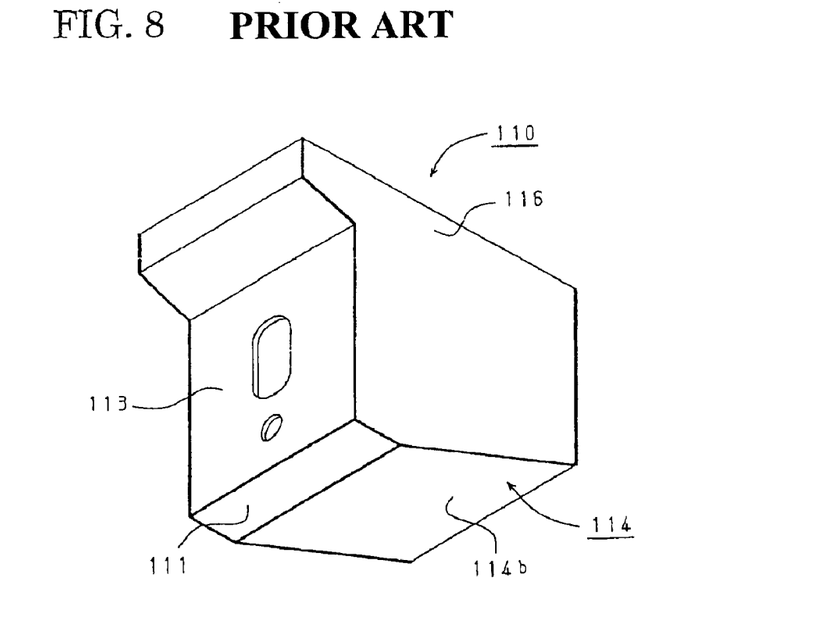
FIG. 8 is a perspective view of a conventional vat.

The vat 110 is made by welding together a plurality of flat panels. As shown in FIG. 7, broadly divided the vat 110 is constituted by a bottom panel 111 that forms a horizontal bottom wall portion, a front panel 113 that is bent in a plurality of locations and forms a front wall portion, a rear panel 114 including a rear wall portion 114a that is formed vertically and opposes the front panel 113 and a bottom wall portion 114b that slopes downward from the rear wall portion 114a toward the front, and left and right panels 115 and 116, respectively, that include vertical side wall portions and are opposed to one another. FIG. 8 shows the vat 110 after it has been welded together. The welding lines (welded portions) are illustrated by the thick solid lines in FIG. 8.

However, since the combustion chamber 123 and the tailpipe 124 are provided with the vat 110 in the fryer 100. Food residue generated from the foods during cooking sticks to the surface of the combustion chamber 123 and the tailpipe 124. Consequently it is not easily reached with cleaning things or with one's hand, which makes cleanup very difficult.

On the other hand, the following problems arise when a burner is used to heat the oil from outside the vat 110.

Figure 6:
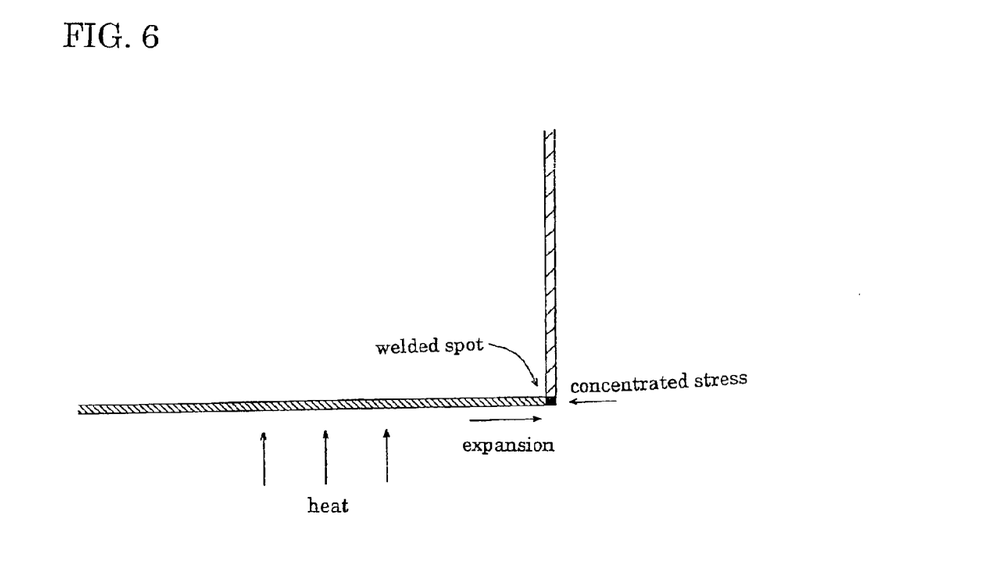
FIG. 6 is a cross-sectional view of a portion of a conventional fryer.

In a fryer that is used intermittently, the heat exchange surface of the vat 110, which is in contact with the approximately 1000° C. combustion gas and is where the exchange of heat takes place, is subject to repeated thermal expansion and contraction due to repeated heating and non-heating during fryer use. Consequently, as shown in FIG. 6, the corner areas of the heat exchange surface are compressed due to thermal expansion of the panels and are pulled due to contraction during cooling. Stress is thus easily concentrated in these corner areas.

Additionally, the composition and the thickness at the welded portions are not uniform, making the welded portions weaker than the non-welded portions. Moreover, the vat 110 is formed by combining flat panels to one another and welding, which means that the welded portions are located in the corner portions of the panels. As a result, the vat 110 is easily cracked due to the contraction and expansion of the panel.

The liquid heating cooker of the present invention solves the foregoing problems, and it is an object thereof to prevent cracking of the vat and increase its durability.

SUMMARY OF THE INVENTION

A liquid heating cooker according to the one aspect of the present invention for solving the foregoing problems includes a box-shaped vat into which a heating medium is filled and which has left and right side wall portions, a front wall portion, a rear wall portion, and a bottom wall portion and a heating means provided opposing the bottom wall portion from the outside, for heating the bottom wall portion by combustion so as to cook foods within the vat. A plurality of panels making up the vat are welded to one another at borders between the wall portions shifted away from corner portions of the vat and form a single unit. The corner portions of the vat are rounded. A liquid heating cooker according to another aspect of the present invention includes a box-shaped vat into which a heating medium is filled and which has left and right side wall portions, a front wall portion, a rear wall portion, a bottom wall portion and a heating means provided opposing the bottom wall portion from the outside, for heating the bottom wall portion by combustion so as to cook foods within the vat. A plurality of panels making up the vat are welded to one another and form a single unit. A left panel forming the left side wall portion and a right panel forming the right side wall portion are bent and each is provided with an integral heating edge wall portion that is coplanar with the bottom wall portion. Left and right ends of a bottom panel forming the bottom wall portion are each welded to an end portion of one of the heating edge wall portions, and at least the heating edge wall portions and the bottom panel are coplanar. The left panel and the right panel are bent and each is provided with an integral front edge wall portion on a plane that is coplanar with the front wall portion. The left and right side ends of the front wall portion of the bottom panel are each welded to an end portion of one of the front edge wall portions, and at least the front edge wall portions and the front wall portion of the bottom panel are coplanar. The bottom wall portion slopes downward and backward and a sediment holding portion is provided at a lower end of the bottom wall portion. Additionally, either the lower end of the bottom wall portion or an end portion of the sediment holding portion is bent so that the two are welded together in a common plane and bent portions of panels traversed by a welded portion are rounded. With the liquid heating cooker of the present invention as configured above, the heating means heats the bottom wall portion of the vat so as to cook foods within the vat. The welding lines between the panels are located on surfaces and not at the corner portions of the vat, which are the borders between the wall portions. As a result, even if stress is repeatedly concentrated at the corner portions due to repeated expansion and contraction of the vat by heating and cooling as the liquid heating cooker is used, cracking due to thermal stress does not easily occur at the welded portions.

The corner portions of the vat are rounded, so that even if the vat is heated by the heating means or cooled, thermal stress is not concentrated at the corner portions, allowing the durability of the corner portions to be maintained.

In other words, the bottom wall portion which is the heating surface, and the left and right side wall portions are connected by welding the bottom panel to heating edge wall portions that bend from the left and right side panels. Thus, welding lines are not provided at the corner portions of the bottom wall portion and the side wall portions, but are instead provided on a surface of the bottom wall portion. As a result, even if stress is repeatedly concentrated at the corner portions due to repeated expansion and contraction of the vat by heating and cooling as the liquid heating cooker is used, cracking does not easily occur at the welding lines.

Not only the bottom wall portion but also the front wall portion and the left and right side wall portions are connected by welding the bottom panel to front edge wall portions that are bent from the left and right panels. Thus, the welding lines are provided on a surface of the front wall portion and are not provided at the corner portions between the front wall portion and the side wall portions. As a result, the welded portions do not easily crack, even if the liquid heating cooker is repeatedly operated and stopped.

Sediment from the foods during cooking is sent to the rear along the bottom wall portion of the vat, which is sloped downward, and collects in the sediment holding portion that is formed at the lower end of the bottom wall portion. Because the end portion of either the lower end of the bottom wall portion or the sediment holding portion is bent and these portions are welded on the same plane, the portion where they are welded to one another is not located at corner portions, and thus does not crack easily.

The bent portions of the panels across which the welded portions where the panels making up the vat are curved. Consequently, heat stress is dispersed at the bent portions of the vat which are easily affected by thermal stress due to expansion and contraction. Thus, the durability of the bent portions is increased. Moreover, the welded portions, where cracking occurs easily, can be disposed across these bent portions without problems.

DESCRIPTION OF THE PREFERRED EMBODIMENTS

To further clarify the configuration and the operation of the present invention as explained above, a preferred embodiment of the liquid heating cooker of the present invention is described below.

A commercial fryer according to an embodiment of the present invention is described below using FIGS. 1 to 5.

Figure 3:
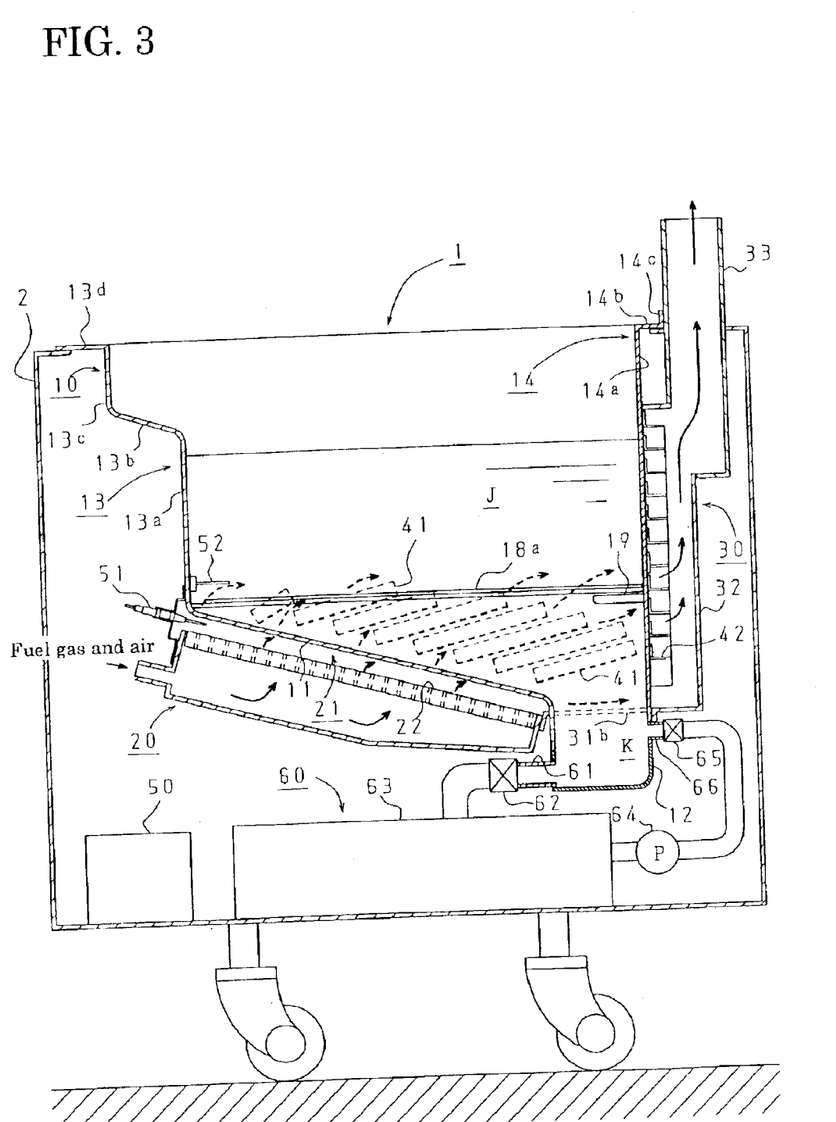
FIG. 3 is a cross-sectional view of a fryer according to the present invention viewed from the side.

As shown in FIG. 3, a fryer 1 includes a main housing 2 into which are provided a box-shaped vat 10 into which cooking oil (heating medium) is filled, a burner 20, which is provided outside in opposition to the vat bottom wall portion 11 for heating the cooking oil, an exhaust duct 30 that conveys combustion gas from the burner 20 to the outside of the fryer while the cooking oil is heated at intermediate positions thereof, a controller 50 for controlling cooking times and the cooking temperature and a filtration/circulation device 60 provided below the vat 10 for filtering the cooking oil. It should be noted that the left side in FIG. 3 corresponds to the front of the fryer, and is the area where a fryer operator performs the task of cooking foods.

Figure 1:
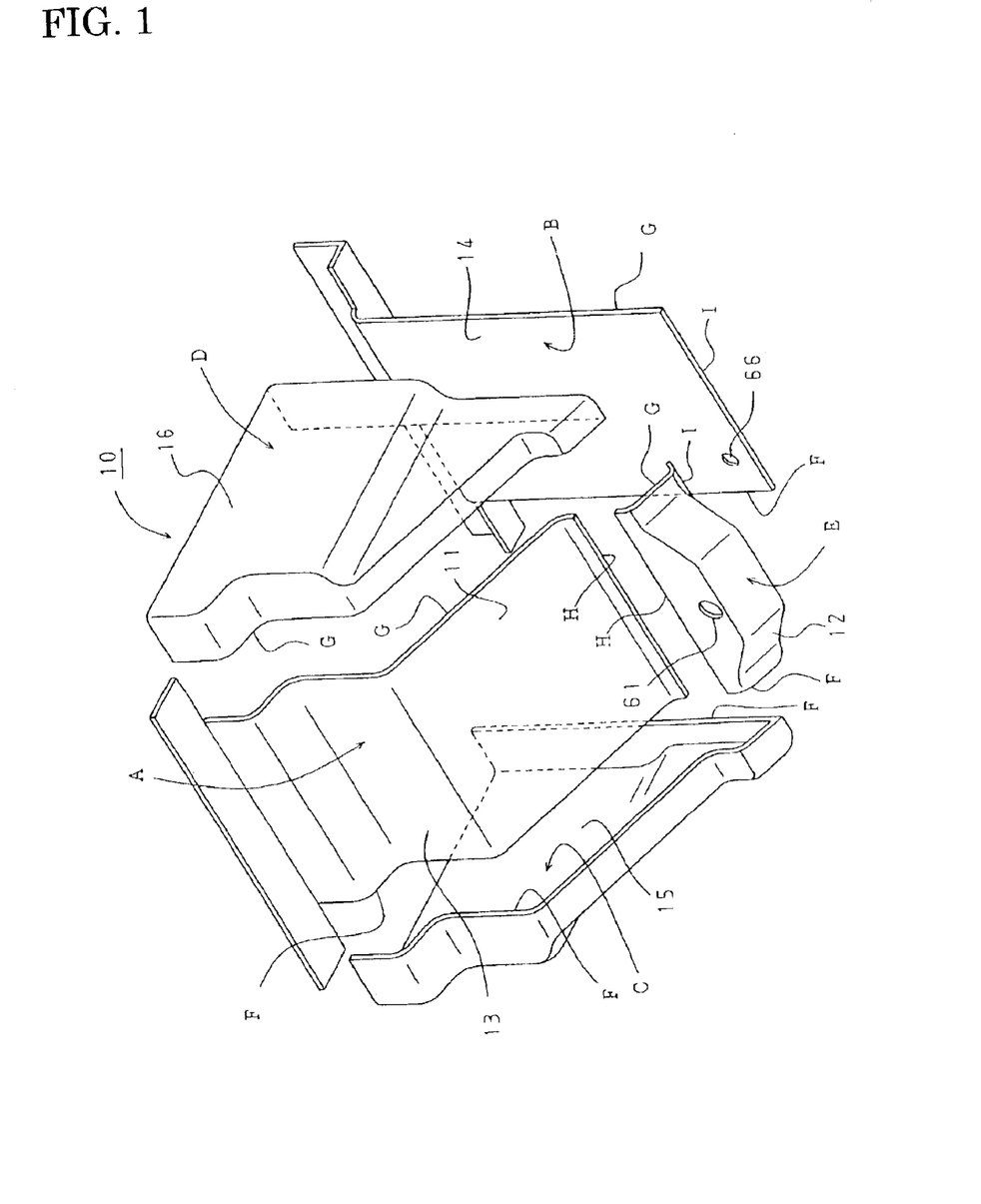
FIG. 1 is a perspective view of components making up a vat according to the present invention.
Figure 2:
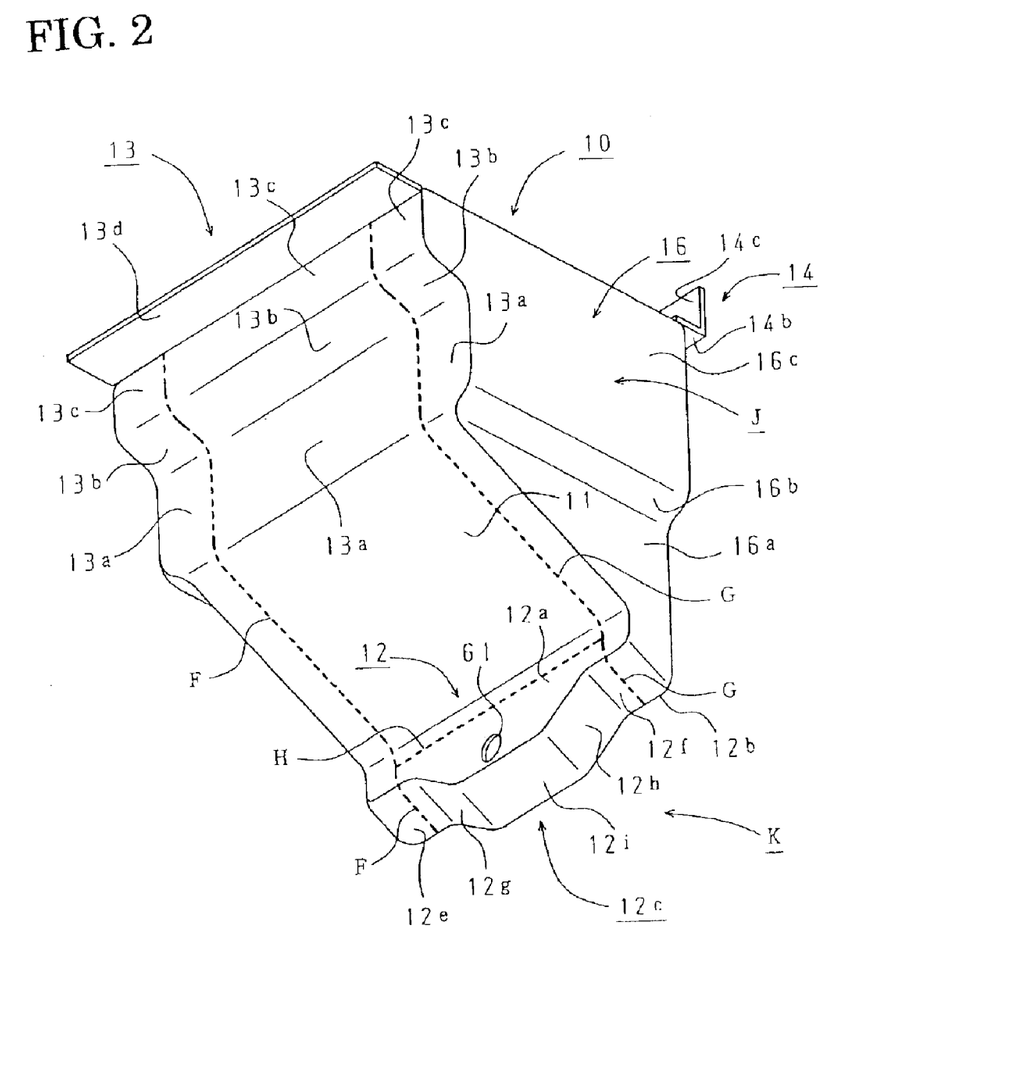
FIG. 2 is a perspective view of a vat according to the present invention.

As shown in FIGS. 1 and 2, the wall surface of the vat 10 can be broadly divided into a bottom wall portion 11, an oil sediment holding portion 12, a front wall portion 13, a rear wall portion 14, a left side wall portion 15, and a right side wall portion 16. Each wall surface portion is bent in a rounded fashion. This bending can be carried out by for example a press drawing process or a bending process, but any process to bend the panel surfaces is suitable. The panels A to E making up the vat 10 are described in detail later.

The front wall portion 13 of the vat 10 is provided with a slope at an intermediate portion thereof, down which foods are slid into the vat 10. The front wall portion 13 includes, in order from the top, a horizontal front attachment portion 13d that is attached to the main housing 2, an upper front wall portion 13c that extends vertically, a middle front wall portion 13b that is bent from the upper front wall portion 13c and slopes downward and backward, and a lower front wall portion 13a that extends vertically from the middle front wall portion 13b.

Figure 4:
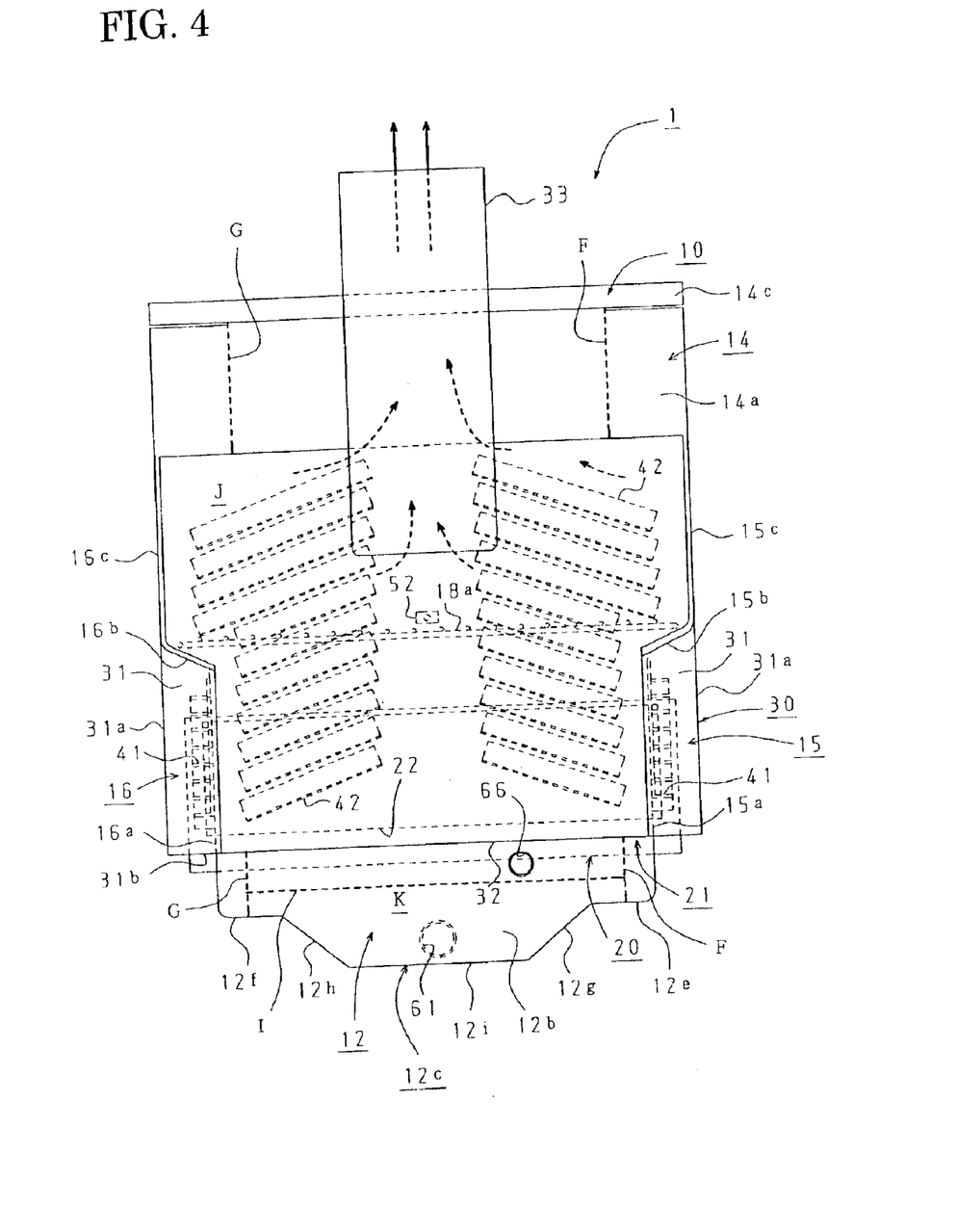
FIG. 4 is a diagram of a fryer according to the present invention viewed from behind.
Figure 5:
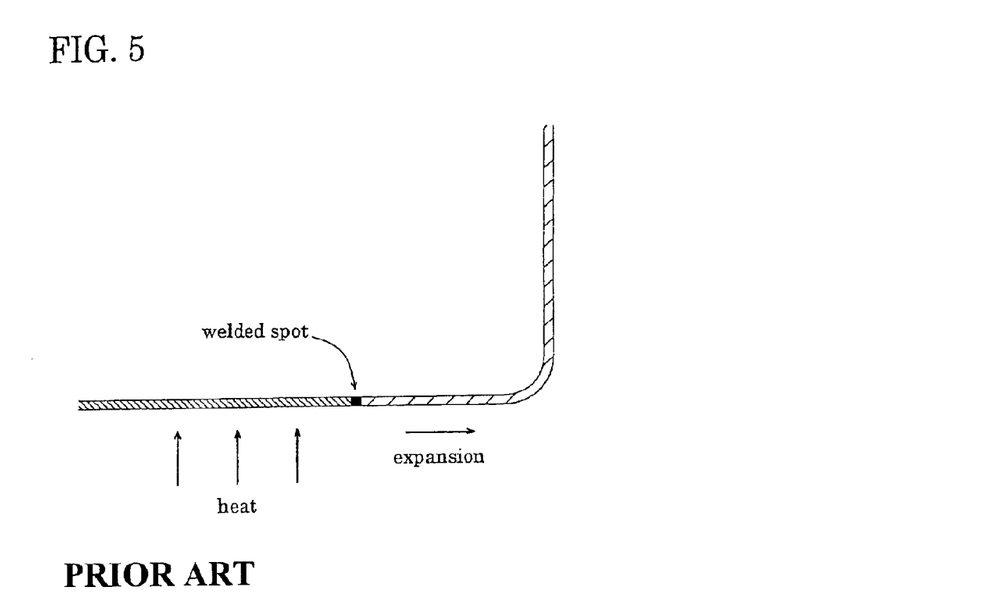
FIG. 5 is a cross-sectional view of a portion of a vat according to the present invention.

Referring to FIG. 4, the left side wall portion 15 and the right side wall portion 16 of the vat 10 have a step portion that forms the exhaust duct 30. They include, in order from the top, upper side wall portions 15c and 16c which are vertical surfaces, middle side wall portions 15b and 16b that are bent from the upper side wall portions 15c and 16c and slope downward and inward, and lower side wall portions 15a and 16a that extend vertically from the middle side wall portions 15b and 16b.

Referring to FIG. 3, the rear wall portion 14 of the vat 10 includes, in order from the top, a rear attachment portion 14c that serves as a vertical surface to which the exhaust duct 33 is attached, a horizontal mounting portion 14b that is mounted to the main housing 2, and a lower rear wall portion 14a that is a vertical surface that is linked to the rear ends of the left and right side wall portions 15 and 16.

Referring again to FIGS. 1 and 2, the bottom wall portion 11 of the vat 10 is a surface that is bent at the lower front wall portion 13a and slopes downward and backward, and its lower end, that is, its rear end, is provided at a predetermined distance from the rear wall portion 14 of the vat 10.

The oil sediment holding portion 12 for holding oil sediment is formed between the lower end of the bottom wall portion 11 and the rear wall portion 14. The oil sediment holding portion 12 is formed in a groove shape extending sideways, and includes a front wall portion 12a being a vertical surface, a rear wall portion 12b joined to the lower rear wall portion 14a, and a bottom wall portion 12c having a step portion and slopes downward and inward.

The bottom wall portion 12c of the oil sediment holding portion 12 includes, in order from the top, left and right upper bottom wall portions 12e and 12f that are horizontal surfaces, left and right middle bottom wall portions 12g and 12h which are bent from the lower end of the upper bottom wall portions 12e and 12f, and slope downward and inward, and a lower bottom wall portion 12i that extends horizontally from the lower end of the middle bottom wall portions 12g and 12h.

The vat 10 including these wall surfaces comprises bottom panel A, a rear panel B, a left panel C, a right panel D, and a sediment holding panel E.

The following is a description of the welding lines F to I (welded portions), which serve as the borderlines between the panels A to E.

The welding lines F and G are provided on the front wall portion 13, the bottom wall portion 11, the front wall portion 12a and the upper bottom wall portions 12e and 12f of the oil sediment holding portion 12, and the rear wall portion 14, at locations that are a predetermined distance away from the left and right side wall portions 15 and 16, respectively. It should be noted that if the vat 10 is viewed from its front or rear surface, the welding lines F and G extend vertically on a straight line and run parallel to one another (shown with the thick dotted line in FIG. 4).

Welding lines H and I are provided on the front wall portion 12a and the rear wall portion 12b of the oil sediment holding portion 12 respectively. These lines H and I are above the upper bottom wall portions 12e and 12f at locations that are a predetermined distance from the bottom wall portion 12c of the oil sediment holding portion 12.

Thus, the welding lines F to I are disposed at locations that are different from the corner portions formed between the wall surfaces of the vat 10.

The bottom wall panel A and the rear wall panel B of the vat 10 have rounded steps formed by bending a single flat panel. The bottom wall panel A includes substantially the entire front wall portion 13, as well as the bottom wall portion 11 and the upper portion of the front wall portion 12a of the oil sediment holding portion 12. The rear wall panel B includes substantially the entire rear wall portion 14 and the upper portion of the rear wall portion 12b of the oil sediment holding portion 12.

The left wall panel C, the right wall panel D, and the sediment holding panel E have been formed by press drawing flat panels. Moreover, they are produced so that the corner portions between the wall surfaces are not angular.

The left wall panel C includes the left side wall portion 15, the left end portion (front edge wall portion) of the front wall portion 13, the left end portion of the rear wall portion 14, the left end portion (heating edge wall portion) of the bottom wall portion 11, and the left upper portion of the oil sediment holding portion 12.

The right wall panel D includes the right side wall portion 16, the right end portion (front edge wall portion) of the front wall portion 13, the right end portion of the rear wall portion 14, the right edge portion (heating edge wall portion) of the bottom wall portion 11, and the right upper portion of the oil sediment holding portion 12.

The sediment holding panel E includes the lower center portion of the oil sediment holding portion 12.

The vat 10 is formed as a single unit by welding these five panels A to E on the welding lines F to I. As a result, the bottom wall portion 11 of the bottom wall panel A and the heating edge wall portions of the left and right wall panels C and D are formed on an identical plane. Also, the front wall portion 13 of the bottom wall panel A and the front edge wall portions of the left and right wall panels C and D are formed on identical planes. Moreover, the front wall portion 12a of the sediment holding panel E and the upper portion of the front wall portion 12a, which is the bottommost end surface of the bottom wall panel A, are formed on an identical plane.

As shown in FIG. 3, the burner 20 is an all primary air burner with a ceramic plate 22 provided as the combustion surface, in which a plurality of burner ports are formed. The combustion surface of the burner 20 is provided opposing the bottom wall portion 11 of the vat 10 at a predetermined spacing from the bottom wall portion 11, forming a combustion chamber 21 therebetween. An ignition electrode 51 is provided in the combustion chamber 21 and overlooks the ceramic plate 22.

As shown in FIG. 4, the exhaust duct 30 for conveying combustion gas from the burner 20 to the outside of the fryer is made of left and right ducts 31, which are in communication with the combustion chamber 21 provided under the front part of the vat 10 and are provided to the left and right outside of the vat 10, a rear duct 32, which is in communication with the left and right ducts 31 and provided behind the vat 10, and a vertically extending exhaust duct 33, which is in communication with the rear duct 32 and is open at its upper end.

Duct side panels 31a are provided to the left and right outside of the vat 10 in opposition to the lower side wall portions 15a and 16a at a predetermined spacing, and are on substantially the same plane as the upper side wall portions 15c and 16c. Also, a box-shaped duct rear panel 31b, in which the front portion and the top portion are open, is provided behind the vat 10. The left and right side walls of the duct rear panel 31b are in contact with the rear wall portion 14, and the bottom wall of the duct rear portion 31b is in contact with the rear end of the burner 20. The left and right ducts 31 are formed by the space enclosed by the duct side panels 31a, the duct rear panel 31b, and the lower side wall portions 15a and 16a and the middle side wall portions 15b and 16b of the vat 10.

On the other hand, the rear duct 32 is formed by the space enclosed by the rear wall portion 14 of the vat 10 and the duct rear panel 31b. Also, the exhaust duct 33 has a narrower width than the rear duct 32.

Side fins 41 are provided in the left and right ducts 31 and are welded to the lower side wall portions 15a and 16a of the vat 10 sloping upward and backward. Rear fins 42 are provided in the rear duct 32 and are welded to the left and right sides of the rear wall portion 14 of the vat 10 in rows parallel to one another and sloping upward and inward. The fins 41 and 42 are provided with L-shaped profiles, promoting the exchange of heat between the combustion gas and the cooking oil. It should be noted that fins having a bracket-shaped cross section can be included among the fins.

Inside the vat 10 is a metal mesh 18a for holding foods or a basket (not shown) containing foods. The metal mesh 18a is supported by a metal mesh support 19 (see FIG. 3) provided on the rear wall portion 14 and by the left and right middle side wall portions 15b and 16b.

The region enclosed by the metal mesh 18a, the lower front wall portion 13a, the upper side wall portions 15c and 16c, and the rear wall portion 14 functions as a cooking zone J.

A thermistor 52 for detecting the temperature of the cooking oil above the metal mesh 18a is provided on the lower front wall portion 13a.

The filtration/circulation device 60, as shown in FIG. 3, includes an inlet pipe 61 provided at the lower center portion of the front wall of the oil sediment holding portion 12, an outlet pipe 66 provided at the upper left portion of the rear wall of the oil sediment holding portion 12, a filter device 63 provided with a filter (not shown) for filtering the cooking oil that is supplied from the inlet pipe 61, and a pump 64 for returning the filtered cooking oil to the vat 10 via the outlet pipe 66. The inlet pipe 61 and the outlet pipe 66 are provided with valves 62 and 65, respectively.

In the fryer 1 configured as above, after cooking oil is filled into the vat 10, the burner 20 is ignited and high temperature combustion gas (approximately 1000° C.) flows from the combustion chamber 21 through the left and right ducts 31 to the rear duct 32, as shown in FIGS. 3 and 4. As a result, the cooking oil is heated by the exchange of heat via the bottom wall portion 11, the lower side wall portions 15a and 16a, the middle side wall portions 15b and 16b, and the rear wall portion 14 of the vat 10. Then, the combustion gas is discharged from the exhaust duct 33.

Once the cooking oil is heated, foods are placed into a basket (not shown), which is then submerged into the vat 10, and the foods are cooked. Alternatively, to prevent cooking oil from splashing out from the vat 10, foods such as croquettes are slid down the middle front wall portion 13b into the cooking zone J and cooked.

The foods are cooked in the high temperature oil, and after a certain amount of time has passed, an alarm alerts the fryer operator to remove the foods from the vat 10 and end cooking.

With the aforementioned fryer according to this embodiment, the heat exchange surface of the vat 10 comes into contact with the high temperature combustion gas when the fryer 1 is in operation and is heated and expands due to the heat. After operation of the fryer 1 is stopped, the heat exchange surface of the vat 10 cools down to normal temperature and contracts. Consequently, intermittent use of the fryer 1 results in repeated expansion and contraction of the heat exchange surface of the vat 10.

The corner portions between the walls of the vat 10 are all rounded through press drawing or bending processes and are not angular. Thus, stress due to this contraction and expansion is dispersed, and the walls are not easily cracked.

In the fryer 1, the welding lines F to I on the vat 10 are not provided at these corner portions (wall end portions) but at intermediate portions of the walls. Consequently, even if thermal stress is concentrated at these corner portions and the composition or the thickness of the welded portions is not the same as that of the non-welded portions, the walls are not affected by the concentrated stress and are not easily cracked.

Moreover, the bent portions of the panels (for example, the bent portion between the lower front wall portion 13a and the middle front wall portion 13b, and the bent portion between the middle front wall portion 13b and the upper front wall portion 13c) are rounded. Thus, even at spots where these bent portions traverse the welding lines F and G, stress is dispersed and cracking is prevented.

Thus, cracking is prevented, and the durability of the vat 10 is accordingly increased.

Also, because the front wall portion 13 and the bottom wall portion 11 of the vat 10 are formed by a single panel (bottom panel A), one welding line can be omitted, which lowers the welding costs.

Furthermore, in the oil sediment holding portion 12, the bottom wall portion 12c is sloped downward and inward, so that oil sediment in the discharged oil naturally collects in the center of the oil sediment holding portion 12, and the discharged oil easily flows to the inlet pipe 61.

The welding lines that separate the oil sediment holding portion 12 in the sideways direction are not provided on the downward sloping walls (left and right middle bottom wall portions 12g and 12h) but are instead provided on the vertical walls (front wall portion 12a and rear wall portion 12b) and on the horizontal walls (left and right upper bottom wall portions 12e and 12f). Consequently, the oil sediment holding portion 12 is easily welded.

Because a sufficient heating area can be secured in the exhaust duct 30 that surrounds the perimeter of the vat 10, the cooking oil can be adequately heated even if the burner 20 is provided in only one spot. Consequently, a plurality of burners is not required, which allows manufacturing costs to be kept down.

Furthermore, the left and right ducts 31 can be provided without jutting out from the width of the cooking zone J (the distance between the left and right upper side wall portions 15c and 16c of the vat 10), allowing the fryer unit to be more compact.

Oil sediment that is generated from foods during cooking settles under its own weight and collects in the oil sediment holding portion 12 while sliding along the wall surface of the vat 10. The oil sediment holding portion 12 is a cold zone K that is hardly heated at all by the burner 20 and in which the cooking oil is hardly circulated. Consequently, oil sediment that has been collected is not returned to the high temperature cooking zone J and heated. As a result, the cooking oil can be kept from degrading.

The oil sediment holding portion 12 is both wide and shallow, so that cleaning tools are able to reach down to the lower bottom wall portion 12i of the oil sediment holding portion 12. Thus, oil sediment that has accumulated in the oil sediment holding portion 12 is easily cleaned up.

Combustion gas from the burner 20 travels from the combustion chamber 21 through the exhaust duct 30, and thus surrounds the entire perimeter of the vat 10 below the cooking zone J. As a result, a large area is heated by the combustion gas, thereby increasing the heating efficiency and saving energy.

The L-shaped side fins 41 and the rear fins 42 are provided at the bottom side wall portions 15a and 16a and the rear wall portion 14 in a sloping manner. Consequently, the rising high temperature combustion gas can be conveyed to the rear duct 32 and reliably brought into contact with the entire heat receiving surface of the fins 41 and 42. As a result, the exchange of heat between the combustion gas and the cooking oil is significantly promoted and is efficient.

In the foregoing, one embodiment of the present invention was described, but the present invention is in no way limited to this particular embodiment, and may of course be embodied in various other forms within a scope that does not depart from the gist of the present invention.

For example, the present invention can be applied to a noodle boiler in place of a fryer, as long as it is an apparatus that cooks foods using a liquid as the heating medium.

Also, for the heating means, an electric heater or a heating means using induction heating can be employed in place of a burner. There are no particular limitations regarding the placement of the heating means as long as it is located outside the vat.

It is not always necessary to provide the oil sediment holding portion 12.

If there is ample space to place the fryer, then the exhaust duct can be disposed surrounding not only the heating zone but also the entire perimeter of the cooking zone, in which case the exchange of heat is further promoted and the heating efficiency increased even more.

As described in detail above, according to the liquid heating cooker of the first aspect of the present invention, each of the panels of the vat are welded at surface locations away from the corner portions, so that cracking at the welded portions due to repeated thermal stress can be prevented, which increases the durability of the welded portions of the vat.

According to the liquid heating cooker of the second aspect of the present invention, the corner portions of the vat are rounded, so that heat stress due to expansion and contraction is dispersed and cracking at the corner portions does not easily occur. Thus, the durability of the vat corner portions is increased.

According to the liquid heating cooker of the third aspect of the present invention, heating edge wall portions are formed in the left and right panels of the vat and the welded portions between the left and right panels and the bottom panel are located on the bottom wall portion and not at corner portions. Thus, cracking at the welded portions can be prevented and the durability of the welded portions of the vat can be increased.

According to the liquid heating cooker of the fourth aspect of the present invention, front edge wall portions are formed in the left and right panels of the vat and the welded portions between the left and right panels and the front wall portion of the bottom panel are located on the front wall portion and not at corner portions. Thus, even if the liquid heating cooker is operated and stopped repeatedly, cracking does not easily occur at the welded portions, and this further increases the durability of the vat.

Moreover, the bottom wall portion and the front wall portion of the vat are formed in one unit using a single panel, and thus the number of welding lines is reduced and welding costs can be kept down.

According to the liquid heating cooker of the fifth aspect of the present invention, the welded portion between the lower end of the bottom wall portion and the sediment holding portion is located on a surface and not at corner portions, so that it does not crack easily, the durability of the vat is not diminished, and food residue is collected in the sediment holding portion, which makes the vat easy to clean.

According to the liquid heating cooker of the sixth aspect of the present invention, the bent portions of the vat over which the welded portions traverse are rounded, so that heat stress due to expansion and contraction is not concentrated and cracking at spots where the bent portions and the welded portions intersect is prevented. Consequently, the durability of the vat can be improved.

What is claimed is:

1. A liquid heating cooker comprising:
   a box-shaped vat into which a heating medium is filled and which has left and right side wall portions, a front wall portion, a rear wall portion, and a bottom wall portion; and
   a heating means provided opposing the bottom wall portion from the outside, for heating the bottom wall portion by combustion so as to cook foods within the vat;
   wherein a plurality of panels making up the vat are welded to one another and form a single unit;
   wherein a left panel forming the left side wall portion and a right panel forming the right side wall portion are bent, each of the left side wall portion and the right side wall portion is provided with an integral heating edge wall portion that is coplanar with the bottom wall portion and each of the left side wall portion and the right side wall portion is provided with an integral front edge wall portion on a plane that is coplanar with that of the front wall portion, and
   wherein left and right ends of a bottom panel forming the bottom wall portion are each welded to an end portion of one of the heating edge wall portions, and at least the heating edge wall portions and the bottom panel are coplanar;
   wherein the bottom panel is bent and also serves as part of the front wall portion; and
   the left and right side ends of the front wall portion of the bottom panel are each welded to an end portion of one of the front edge wall portions, and at least the front edge wall portions and the front wall portion of the bottom panel are coplanar.

2. The liquid heating cooker according to claim 1, wherein the bottom wall portion slopes downward and backward and a sediment holding portion is provided at a lower end of the bottom wall portion; and
   wherein either the lower end of the bottom wall portion or an end portion of the sediment holding portion is bent so that the two are welded together in a common plane.

3. The liquid heating cooker according to claim 2, wherein bent portions of panels traversed by a welded portion are rounded.

4. The liquid heating cooker according to claim 1, wherein bent portions of panels traversed by a welded portion are rounded.

5. The liquid heating cooker according to claim 1, wherein said right panel and said left panel each include a lower portion having a step portion defining an exhaust duct through which combustion gases travel to improve heating efficiency.

6. The liquid heating cooker according to claim 1, wherein each said left panel and said right panel is formed from a flat panel by press drawing.

* * * * *